United States Patent
Chou

(10) Patent No.: US 9,048,947 B2
(45) Date of Patent: Jun. 2, 2015

(54) OPTICAL RECEIVER HAVING AN AUTOMATIC FIBER OPTIC SIGNAL ADJUSTMENT CIRCUIT

(75) Inventor: Koutoung Chou, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 931 days.

(21) Appl. No.: 12/331,826

(22) Filed: Dec. 10, 2008

(65) Prior Publication Data

US 2010/0142972 A1 Jun. 10, 2010

(51) Int. Cl.
*H04B 10/00* (2013.01)
*H04B 10/06* (2006.01)
*H04B 10/079* (2013.01)
*H04B 10/564* (2013.01)

(52) U.S. Cl.
CPC ........ *H04B 10/07955* (2013.01); *H04B 10/564* (2013.01)

(58) Field of Classification Search
CPC ...................................................... H04B 10/40
USPC ........................ 398/158, 160, 197, 210, 162
See application file for complete search history.

(56) References Cited

U.S. PATENT DOCUMENTS

| | | | | |
|---|---|---|---|---|
| 5,835,250 A | * | 11/1998 | Kanesaka | 398/197 |
| 5,969,840 A | * | 10/1999 | Roberts | 398/32 |
| 6,580,531 B1 | * | 6/2003 | Swanson et al. | 398/5 |
| 6,667,965 B1 | * | 12/2003 | Yamaura et al. | 370/347 |
| 7,092,638 B2 | * | 8/2006 | Funami et al. | 398/158 |
| 7,729,620 B2 | * | 6/2010 | Schatz et al. | 398/160 |
| 7,783,207 B2 | * | 8/2010 | Kaneda | 398/202 |
| 7,904,035 B2 | * | 3/2011 | Kasha et al. | 455/115.2 |
| 2003/0039002 A1 | * | 2/2003 | Toriumi et al. | 359/113 |
| 2004/0062557 A1 | * | 4/2004 | Takashima et al. | 398/209 |
| 2004/0109661 A1 | * | 6/2004 | Bierman et al. | 385/140 |
| 2005/0158057 A1 | * | 7/2005 | Tomofuji et al. | 398/160 |
| 2006/0018226 A1 | * | 1/2006 | Sekiguchi et al. | 369/47.53 |
| 2007/0071450 A1 | * | 3/2007 | Schatz et al. | 398/162 |
| 2007/0071451 A1 | * | 3/2007 | Schatz et al. | 398/162 |
| 2007/0077073 A1 | * | 4/2007 | Shimada | 398/158 |
| 2007/0189768 A1 | * | 8/2007 | Yang et al. | 398/38 |
| 2007/0206964 A1 | * | 9/2007 | Lee et al. | 398/208 |
| 2008/0056725 A1 | * | 3/2008 | Hettstedt et al. | 398/147 |
| 2008/0303956 A1 | * | 12/2008 | Nakagawa | 348/723 |
| 2009/0003845 A1 | * | 1/2009 | Kaneda | 398/210 |
| 2010/0250915 A1 | * | 9/2010 | La Fetra | 713/100 |
| 2012/0179952 A1 | * | 7/2012 | Tuyls et al. | 714/768 |
| 2012/0263460 A1 | * | 10/2012 | Movassaghi et al. | 398/38 |

\* cited by examiner

*Primary Examiner* — Ken Vanderpuye
*Assistant Examiner* — Amritbir Sandhu

(57) ABSTRACT

A fiber optic communication system includes a first fiber optic device configured to transmit a fiber optic signal. A second fiber optic device is in fiber optic communication with and configured to receive the fiber optic signal from the first fiber optic device. The second fiber optic device includes an adjustment circuit configured to automatically adjust the fiber optic signal if the fiber optic signal is transmitted outside of a predetermined signal strength range.

18 Claims, 3 Drawing Sheets

OPTICAL RECEIVER HAVING AN AUTOMATIC FIBER OPTIC SIGNAL ADJUSTMENT CIRCUIT

BACKGROUND INFORMATION

Fiber optic communication uses light to transmit data between electronic devices. Each optical fiber has a reflective inner surface that reflects the light along a length of the fiber. Fiber optic devices used in fiber optic communication may include an optical interface that transmits and/or receives fiber optic signals. The optical fibers are physically connected to the optical interface, and light is transmitted and/or received at each of the optical interfaces.

A fiber optic communication system may include many fiber optic devices that are, often times, made by several different manufacturers that may have different signal strength specifications. In particular, some fiber optic devices may transmit fiber optic signals at a strength that cannot be received by another fiber optic device. For example, a first fiber optic device may transmit fiber optic signals at a power rate between 1 dBm and 10 dBm to span a long distance. Some optical loss is expected, so the fiber optic signal is transmitted with a high signal strength (i.e., high power). As the fiber optic signal travels long distances, the signal strength weakens because of optical losses. However, fiber optic devices geographically near the first fiber optic device may receive the fiber optic signal having the high signal strength. The optical device may not be configured to receive the fiber optic signal having such a high signal strength. In particular, a second fiber optic device may be configured to receive fiber optic signals transmitted at a power rate between −1 dBm and −10 dBm. Because the second fiber optic device is receiving the fiber optic signal outside its strength range, the second fiber optic device will not accept the fiber optic signal. Thus, the first and second fiber optic devices cannot communicate with one another.

If the fiber optic signal strength is too high, a field technician uses an attenuator to adjust the strength of the signal transmitted by the first fiber optic device so that it is within the strength range of the second fiber optic device. The field technician measures the strength transmitted by the first fiber optic device and then places various attenuators between the first and second fiber optic devices until the second fiber optic device accepts the signal transmitted from the first fiber optic device. This is often a very time consuming process because finding the correct attenuator requires trial and error. Plus, the field technician must always have various attenuators available to try. These services are often performed at night when signal traffic on the fiber optic communication system is low to minimize disrupting service. Therefore, the field technician has a short window of opportunity to perform these services. Not having the correct attenuator available, or having to try multiple signal adjustment devices before finding the correct one, greatly increases the time it takes for the field technician to perform the service.

Accordingly, a fiber optic device is needed that automatically adjusts the strength of fiber optic signals transmitted outside of a predetermined signal strength range of an optical receiver.

DETAILED DESCRIPTION

A fiber optic communication system includes a first fiber optic device configured to transmit a fiber optic signal and a second fiber optic device configured to adjust the fiber optic signal if the fiber optic signal is transmitted within a predetermined signal strength range. The second fiber optic device includes an optical receiver having an adjustment circuit that automatically adjusts the fiber optic signal. Adjusting the signal strength of the fiber optic signal may include attenuating the fiber optic signal if the signal strength is stronger than the predetermined signal strength range. If the adjustment circuit attenuates the fiber optic signal too much, the adjustment circuit reduces the attenuation until the signal strength of the fiber optic signal is within the predetermined strength range.

Figure 1:
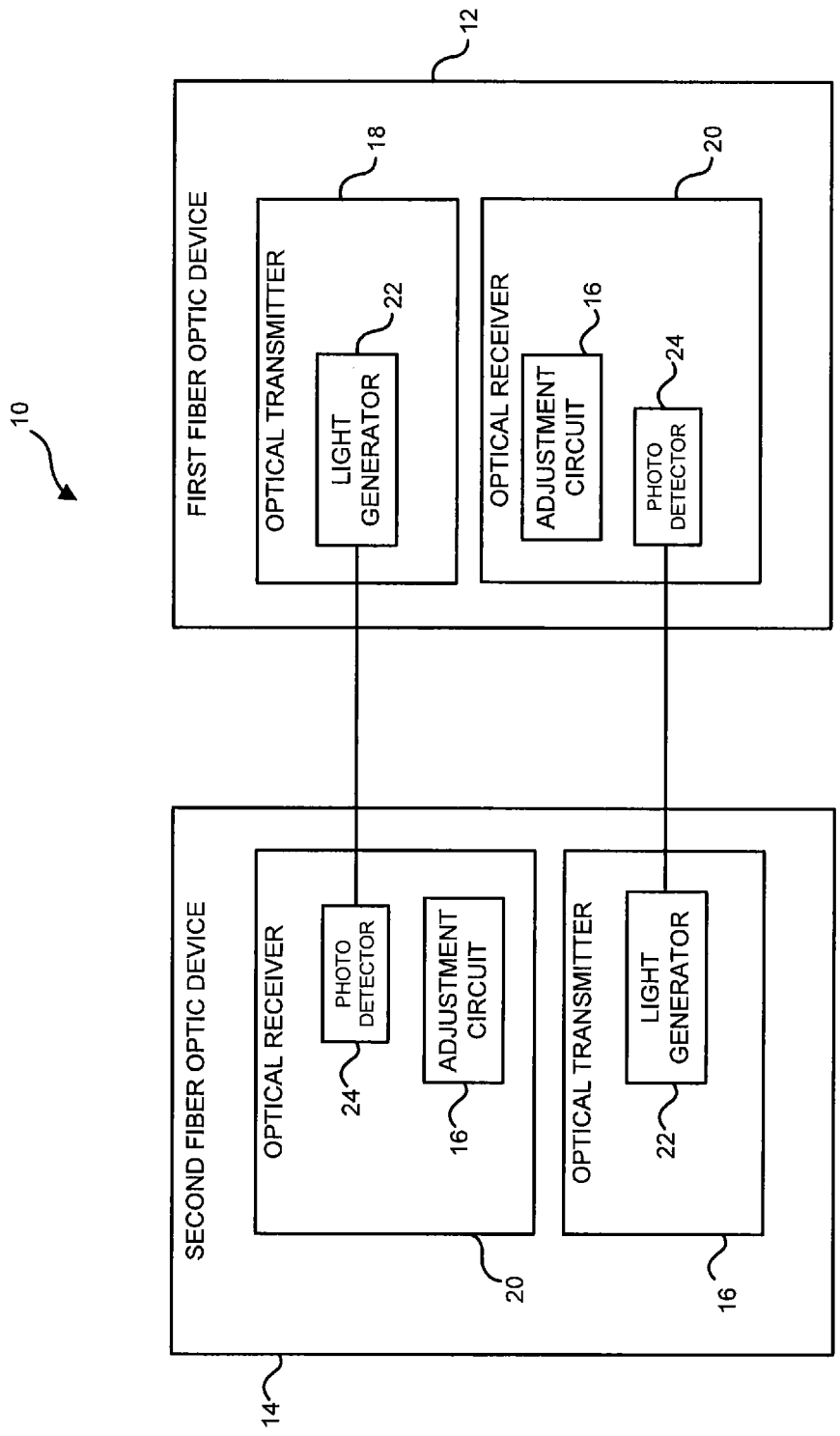
FIG. 1 is an exemplary diagram of a fiber optic communication system.

FIG. 1 is an exemplary diagram of a fiber optic communication system 10 that includes a first fiber optic device 12 in fiber optic communication with a second fiber optic device 14. The first and second fiber optic devices 12, 14 may include any device having a fiber optic port. For instance, the first and second fiber optic devices 12, 14 may include a fiber optic switch, router, transmission device, hub, etc. In one exemplary approach, the first fiber optic device 12 is configured to transmit a fiber optic signal to the second fiber optic device 14. The fiber optic signal has a signal strength when it is transmitted. The second fiber optic device 14 is configured to accept the fiber optic signal if the signal strength of the fiber optic signal is within a predetermined signal strength range. If the fiber optic signal is too strong, the second fiber optic device 14 adjusts the strength of the fiber optic signal. Accordingly, the second fiber optic device 14 includes an adjustment circuit 16 configured to automatically adjust the fiber optic signal if the second fiber optic device 14 receives the fiber optic signal outside of the predetermined signal strength range.

The first and second fiber optic devices 12, 14 may each include an optical transmitter 18 and an optical receiver 20. Each transmitter 18 may include a light generator 22, such as a light emitting diode (LED) or laser diode, to generate the fiber optic signal. Each receiver 20 is configured to receive light, and may include a photodetector 24, such as a photodiode, that converts light into electricity, for example. In one exemplary approach, the first fiber optic device 12 includes at least one transmitter 18, and the second fiber optic device 14 includes at least one receiver 20. However, the first and second fiber optic devices 12,14 may include any number of transmitters 18 and/or receivers 20.

The light generator 22 of the transmitter 18 is configured to transmit the fiber optic signal at a specific signal strength called the launched power rate. The receiver 20 is configured to accept fiber optic signals if the signal strength is within the predetermined signal strength range, which is defined by a saturation rate and a sensitivity rate. The saturation rate defines the maximum signal strength accepted by the receiver 20, and the sensitivity rate defines the minimum strength accepted by the receiver 20. In other words, the receiver 20 can only accept fiber optic signals with a launched power rate at or below the saturation rate and at or above the sensitivity rate, and the receiver 20 adjusts fiber optic signals with a launched power rate above the saturation rate or below the sensitivity rate. The strength of the fiber optic signal may be a power ratio (dBm) measured in decibels (dB) referenced to one milliwatt (mW). For example, the transmitter 18 may transmit the fiber optic signal with a launched power rate of 0.5 dBm. However, the receiver 20 may be configured to receive fiber optic signals at or between a saturation rate of −1.0 dBm and a sensitive rate of −9.9 dBm. The adjustment circuit 16 adjusts the fiber optic signal until its power rate falls between the saturation rate and the sensitivity rate.

Figure 2:
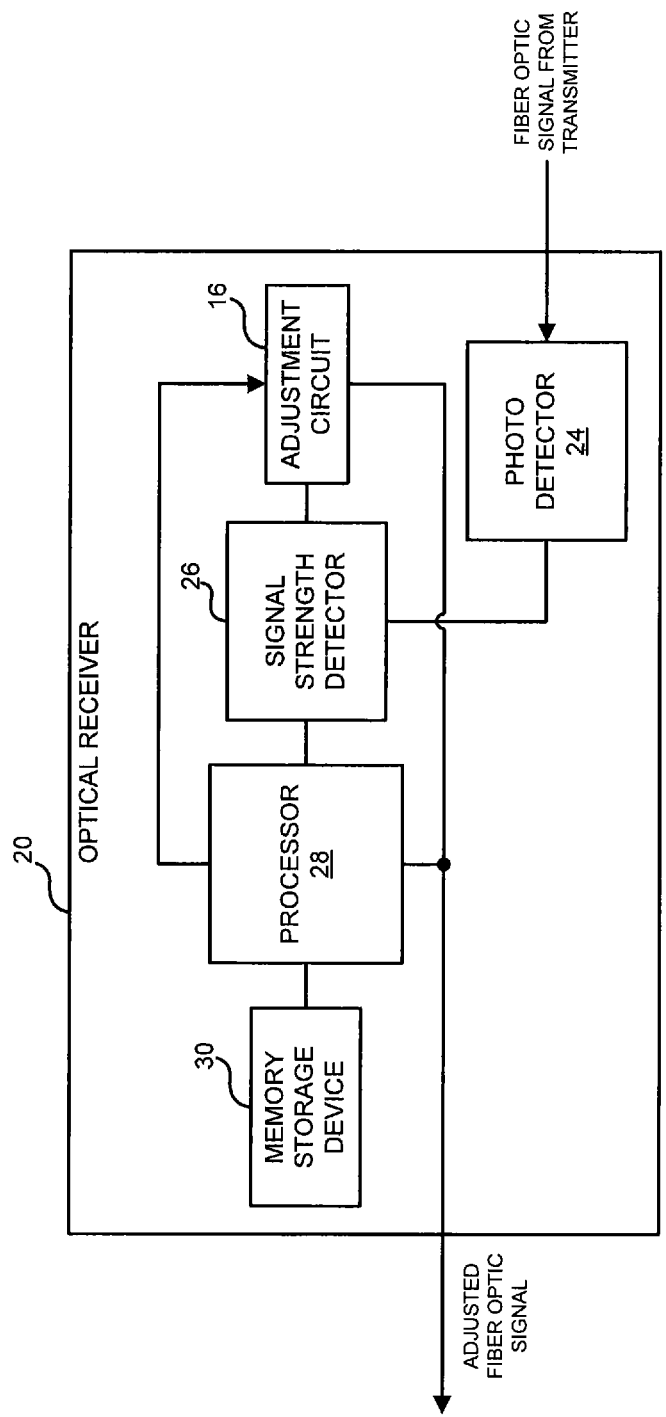
FIG. 2 is an exemplary diagram of an optical receiver having an adjustment circuit.

FIG. 2 is an exemplary diagram of the optical receiver 20. To automatically adjust the fiber optic signals, the optical receiver 20 includes a signal strength detector 26 configured to measure the signal strength of the fiber optic signal. The signal strength detector 26 may include an optical power meter or any other device configured to measure optical signal strength or the intensity of the fiber optic signal. The signal strength detector 26 may use, for example, optical reflection or refraction to determine the strength of the fiber optic signal. The photodetector 24 transmits the fiber optic signal received from the transmitter 18 to the signal strength detector 26. A processor 28 is in communication with the signal strength detector 26 and is configured to compare the signal strength of the fiber optic signal to the predetermined signal strength range to calculate an adjustment value. The adjustment value may be a numerical representation of the magnitude of the adjustment needed for the signal strength of the fiber optic signal to be within the predetermined signal strength range. The adjustment value may be used to generate a control signal that controls the amount of adjustment performed by the adjustment circuit 16, as described in further detail below. The adjustment circuit 16 is in communication with the processor 28 and is configured to adjust the fiber optic signal if the signal strength of the fiber optic signal is outside of the predetermined signal strength range. The adjustment circuit 16 receives the control signal corresponding to the adjustment value from the processor 28, and adjusts the fiber optic signal accordingly before outputting an adjusted fiber optic signal with the signal strength within the predetermined signal strength range.

In one particular implementation, the adjustment circuit 16 applies the adjustment value to the fiber optic signal. The signal detector 26 and processor 28 determine whether the fiber optic signal needs to be adjusted, and in particular, attenuated. The magnitude of the adjustment needed is numerically represented by the adjustment value. The control signal is generated corresponding to the adjustment value, and the control signal causes the adjustment circuit 16 to attenuate the fiber optic signal so that the adjustment circuit 16 can output the adjusted fiber optic signal having the adjusted signal strength that is within the predetermined signal strength range. The adjustment value is calculated by the processor 28 based on the difference between the signal strength of the fiber optic signal and the saturation rate and/or the sensitivity rate of the receiver 20. In one exemplary approach, the signal strength is compared to the saturation rate. If the signal strength is greater than the saturation rate, the saturation rate is subtracted from the signal strength to define the adjustment value, which in this exemplary approach would attenuate the fiber optic signal. However, attenuating the fiber optic signal may result in the signal strength falling below the sensitivity rate. Therefore, after the fiber optic signal has been attenuated, the attenuated fiber optic signal is then compared to the sensitivity rate. If the attenuated signal strength is below the sensitivity rate, a new adjustment value is calculated with a magnitude that is less than the original adjustment value, which increases the signal strength. In other words, the attenuation value may be iteratively increased or decreased to keep the signal strength within the predetermined signal strength range. Once it has been determined that the adjusted signal strength is within the predetermined signal strength range, the optical receiver 20 may accept the fiber optic signal and output the adjusted fiber optic signal.

In one particular implementation, the adjustment value may be raised or lowered slightly to be at least a predetermined numerical distance from the sensitivity rate and/or the saturation rate. For example, the adjustment value may be calculated such that the adjusted signal strength is at least 0.5 dBm within the predetermined signal strength range. If the sensitivity rate is −10 dBm and the saturation rate is −1 dBm, the predetermined signal strength range is −10 dBm to −1 dBm. However, the adjustment value may be calculated so that the adjusted signal strength is at or between −9.5 dBm and −1.5 dBm (i.e, at least 0.5 dBm within the predetermined signal strength range). Accordingly, if the signal strength (i.e., launched power rate) of the fiber optic signal is 1 dBm, it is 2 dBm outside the predetermined signal strength range and needs to be attenuated. Instead of attenuating the fiber optic signal by 2 dBm, the processor 28 may output the control signal corresponding to the attenuation value of 2.5 dBm so that the adjusted fiber optic signal is at least 0.5 dBm within the predetermined signal strength range. This is merely exemplary and the adjustment value may be raised or lower by other predetermined amounts.

The adjustment circuit 16 may include various devices to attenuate the fiber optic signal. In one exemplary approach, the adjustment circuit 16 may include an optical attenuator, such as a variable optical attenuator, that receives the adjustment value from the processor 28, and attenuates the fiber optic signal to output the adjusted fiber optic signal. The adjustment circuit 16 is configured to automatically attenuate the fiber optic signal according to the adjustment value. Several ways to attenuate the fiber optic signal include passing the fiber optic signal through a variable-attenuation filter, increasing optical loss within the fiber optic cable, changing the refractive index of an inner reflective surface of the fiber optic cable, and/or partially blocking the fiber optic signal by inserting a beam block into its path. The amount of attenuation is directly related to the control signal output by the processor 28 that is derived from the adjustment value. For example, if the adjustment value indicates an attenuation of 2 dBm is needed, the processor 28 outputs the control signal to the adjustment circuit 16 that causes the adjustment circuit 16 to attenuate the fiber optic signal by 2 dBm. In one exemplary approach, if the adjustment circuit 16 uses a variable optical attenuator with variable-attenuation filters to attenuate the fiber optic signal, the variable optical attenuator can add more or less filters based on the adjustment value to attenuate the fiber optic signal. Accordingly, the larger the adjustment value, the more filters are used to attenuate the fiber optic signal, and vice versa. If the fiber optic signal is attenuated below the sensitivity rate, the processor 28 may calculate a new attenuation value that increases the signal strength of the fiber optic signal (i.e., reduce the attenuation) as previously discussed, or in one exemplary approach, include an amplifier (not shown) to amplify the signal strength.

The optical receiver 20 may include a memory storage device 30 in communication with the processor 28. The memory storage device 30 stores data in a tangible computer readable medium. For example, the memory storage device 30 may store tangible data relating to the saturation rate and sensitivity rate of the optical receiver 20. Moreover, the memory storage device 30 may store algorithms tangibly embodied as a set of computer-executable instructions that are used to calculate the adjustment value.

Figure 3:
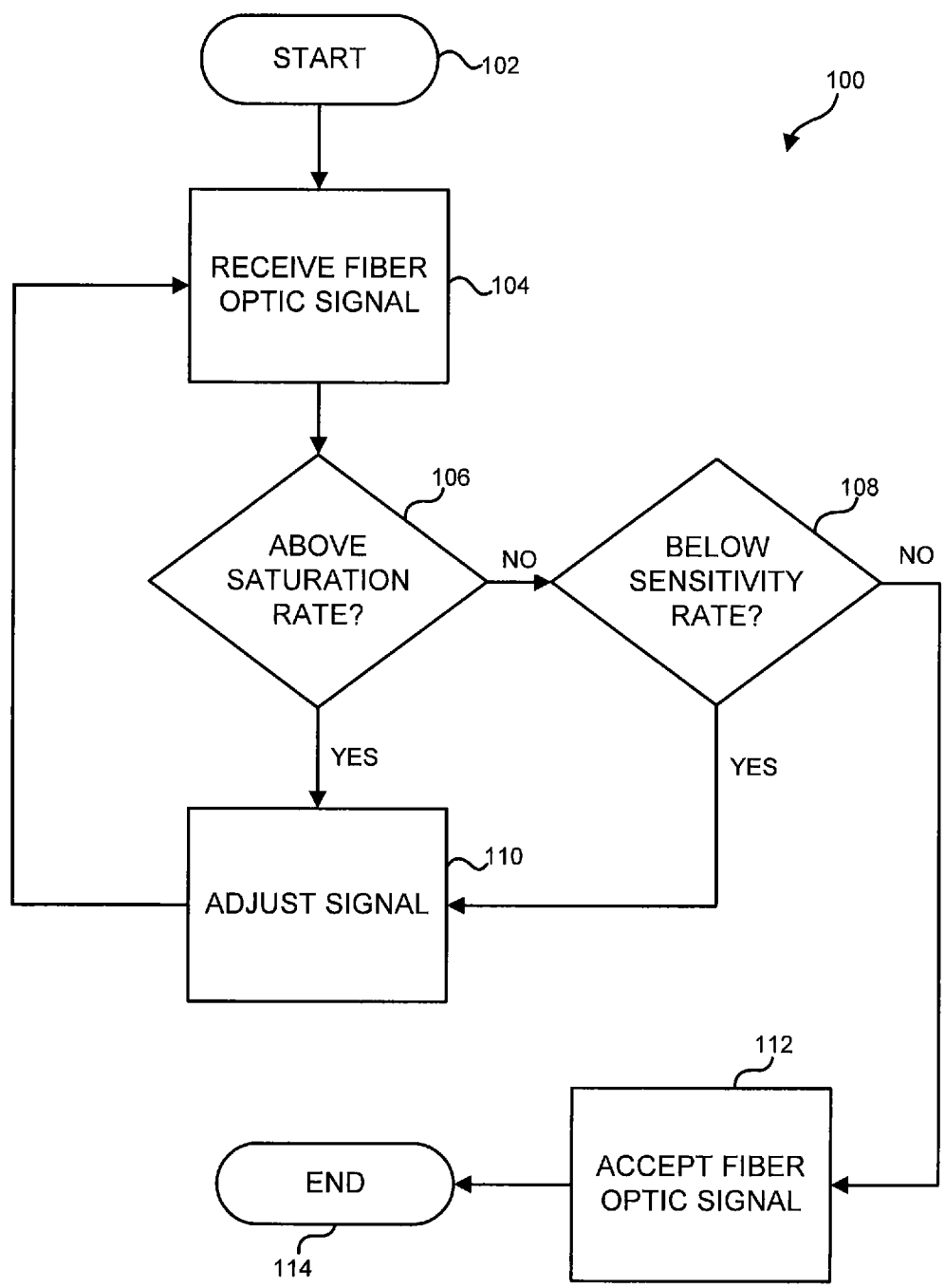
FIG. 3 is a flowchart of an exemplary heuristic executed by the optical receiver.

FIG. 3 is a flowchart illustrating an exemplary heuristic 100 performed by the processor 28 and stored in a tangible computer readable medium. The heuristic 100 starts at step 102 as the optical receiver 20 waits for the fiber optic signal. Then the heuristic 100 includes a step 104 of receiving the fiber optic signal. Before accepting the fiber optic signal, the heuristic 100 determines whether the fiber optic signal exceeds the saturation rate of the receiver 20 at step 106. If no, the receiver 20 then determines whether the fiber optic signal is below the sensitivity rate at step 108. Alternatively, the receiver 20 may determine whether the fiber optic signal is below the sensitivity rate at step 108 before determining whether the fiber optic signal is above the saturation rate at step 106. If the fiber optic signal is above the saturation rate at step 106 or below the sensitivity rate at step 108, then the heuristic 100 includes a step 110 of adjusting the fiber optic signal. Adjusting the fiber optic signal may include attenuating the fiber optic signal if the signal strength exceeds the sensitivity rate, and/or reducing the attenuation if the signal strength is below the sensitivity rate. Then, steps 104, 106, 108 and 110 may be repeated as necessary until the strength of the fiber optic signal is within the predetermined strength range, at which time, the receiver 20 accepts the fiber optic signal at step 112 and outputs the adjusted fiber optic signal. Once the fiber optic signal is accepted, the heuristic 100 ends at step 114 by waiting for another fiber optic signal to be transmitted to the optical receiver 20. Then, the heuristic 100 may be repeated by beginning again at step 102.

The fiber optic communication system 10 may include any number of hardware and/or software, including computing devices that generally include applications, which may be software applications tangibly embodied as a set of computer-executable instructions on a computer readable medium within the computing device. Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 28 (e.g., a microprocessor 28) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Any method steps described herein may be generally tangibly embodied as one or more sets of computer-executable instructions stored on a computer-readable medium. Such computer readable-medium may be included in or associated with one or more computing devices, even if such devices are not illustrated in the Figures. The method steps accordingly generally execute within one or more such computing devices.

A computer-readable medium includes any medium, including a tangible medium, which participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The tangible computer-readable medium may include instructions for performing any of the steps previously recited. However, it is to be appreciated that the tangible computer-readable medium may include instructions for performing steps other than those recited. It is to be further appreciated that some of steps may be performed by the computer, whereas other steps may be performed by a person or another computer.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and method will be incorporated into such future systems. In sum, it should be understood that the invention is capable of modification and variation and is limited only by the following claims.

All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites explicitly to the contrary.

I claim:

1. A fiber optic communication system comprising:
a first fiber optic device configured to transmit a fiber optic signal having a signal strength; and
a second fiber optic device in fiber optic communication with said first fiber optic device and configured to receive the fiber optic signal from said first fiber optic device, wherein the second fiber optic device is configured to receive the fiber optic signal within a first predetermined signal strength range defined by a saturation rate and a sensitivity rate of the second fiber optic device;
wherein said second fiber optic device includes an adjustment circuit configured to automatically and iteratively adjust the fiber optic signal to be within a second predetermined signal strength range defined by the first predetermined signal strength range reduced by a predetermined margin when the fiber optic signal is received at the second fiber optic device outside of the first or second predetermined signal strength range, and to accept and output the fiber optic signal after the fiber optic signal is within the second predetermined signal strength range;

wherein said adjustment circuit is configured to automatically and iteratively adjust the fiber optic signal by:
adjusting the fiber optic signal by a adjustment value based on a difference between the signal strength of the fiber optic signal and one of the saturation rate and the sensitivity rate of the second fiber optic device;
comparing the signal strength of the adjusted fiber optic signal to the other of the saturation rate and the sensitivity rate of the second fiber optic device;
in response to the fiber signal strength of the adjusted fiber optic signal being outside of the other of the saturation rate and the sensitivity rate, calculating a second adjustment value that is the difference between the signal strength of the adjusted fiber optic signal and the other of the saturation rate and the sensitivity rate; and
adjusting the adjusted fiber optic signal by the second adjustment value;

wherein the adjustment circuit is configured to transmit the fiber optic signal without adjustment if the fiber optic signal is received within one of the first predetermined signal strength range and the second predetermined signal strength range; and wherein said second fiber optic device is configured to measure the signal strength of the fiber optic signal prior to the fiber optic signal passing through the adjustment circuit.

2. A fiber optic communication system as set forth in claim 1, wherein said adjustment circuit is configured to apply an adjustment value to the fiber optic signal, wherein the adjustment circuit is configured to attenuate the fiber optical signal to be within the second predetermined signal strength range based on the adjustment value.

3. A fiber optic communication system as set forth in claim 1, wherein the fiber optic signal has a signal strength defined by a launched power rate of said first fiber optic device.

4. A fiber optic communication system as set forth in claim 3, wherein the launched power rate is outside of the predetermined signal strength range.

5. A method comprising:
transmitting, by a first fiber optic device, a fiber optic signal to a second fiber optic device having a first predetermined signal strength range defined by a saturation rate and a sensitivity rate of the second fiber optic device;
measuring a signal strength of a fiber optic signal;
comparing the signal strength of the fiber optic signal to one of the saturation rate and the sensitivity rate of the second fiber optic device;
calculating an adjustment value based on a difference between the signal strength of the fiber optic signal and the one of the saturation rate and the sensitivity rate of the second fiber optic device;
passing the fiber optic signal to an adjustment circuit of the second fiber optic device;
automatically and iteratively adjusting, by the adjustment circuit, the fiber optic signal to a signal strength within a second predetermined signal strength range defined by the first predetermined signal strength range reduced by a predetermined margin when the measured signal strength of the fiber optic signal is received at the second fiber optic device outside the first predetermined signal strength range, wherein automatically adjusting the fiber optic signal is further defined as automatically attenuating the fiber optic signal if the strength of the fiber optic signal is greater than the saturation rate;
transmitting, by the adjustment circuit, the fiber optic signal after the fiber optic signal is within the second predetermined signal strength range; and
transmitting, by the adjustment circuit, the fiber optic signal without adjustment if the fiber optic signal is received within one of the first predetermined signal strength range and the second predetermined signal strength range;

wherein the automatically and iteratively adjusting the fiber optic signal includes:
adjusting the fiber optic signal by the adjustment value;
comparing the signal strength of the adjusted fiber optic signal to the other of the saturation rate and the sensitivity rate of the second fiber optic device;
in response to the fiber signal strength of the adjusted fiber optic signal being outside of the other of the saturation rate and the sensitivity rate, calculating a second adjustment value that is the difference between the signal strength of the adjusted fiber optic signal and the other of the saturation rate and the sensitivity rate; and
adjusting the adjusted fiber optic signal by the second adjustment value.

6. A method as set forth in claim 5, wherein automatically adjusting the fiber optic signal is further defined as automatically reducing the attenuation if the strength of the fiber optic signal is below the sensitivity rate.

7. A method as set forth in claim 5, wherein automatically adjusting the fiber optic signal is further defined as automatically adjusting the fiber optic signal based on the adjustment value if the measured signal strength is outside the first predetermined signal strength range.

8. A method as set forth in claim 5, wherein the fiber optic signal has an adjusted signal strength after being automatically adjusted, and further comprising comparing the adjusted signal strength to the predetermined signal strength.

9. A method as set forth in claim 8, further comprising automatically adjusting the fiber optic signal to a signal strength within the second predetermined signal strength range if the adjusted signal strength is outside the first predetermined signal strength range.

10. An optical receiver comprising:
a signal strength detector configured to measure a signal strength of a fiber optic signal;
a processor configured to compare the signal strength of the fiber optic signal to a first predetermined signal strength range defined by a saturation rate and a sensitivity rate; and
an adjustment circuit configured to receive the fiber optic signal from the signal strength detector, and to iteratively adjust the fiber optic signal to a signal strength within a second predetermined signal strength range defined by the first predetermined signal strength range reduced by a predetermined margin when the measured signal strength of the fiber optic signal is received at the signal strength detector outside of the first predetermined signal strength range, and to accept and output the fiber optic signal after the fiber optic signal is within the second predetermined signal strength range, and wherein the adjustment circuit is configured to transmit the fiber optic signal without adjustment if the fiber optic signal is received within one of the first predetermined signal strength range and the predetermined signal strength range;

wherein said adjustment circuit is configured to adjust the fiber optic signal by:

adjusting the fiber optic signal by an adjustment value based on a difference between the signal strength of the fiber optic signal and one of the saturation rate and the sensitivity rate;

comparing the signal strength of the adjusted fiber optic to the other of the saturation rate and the sensitivity rate;

in response to the fiber signal strength of the adjusted fiber optic signal being outside of the other of the saturation rate and the sensitivity rate, calculating a second adjustment value that is the difference between the signal strength of the adjusted fiber optic signal and the other of the saturation rate and the sensitivity rate; and adjusting the adjusted fiber optic signal by the second adjustment value.

11. An optical receiver as set forth in claim 10, wherein said adjustment circuit is configured to iteratively adjust the fiber optic signal until the signal strength of the fiber optic signal is within the second predetermined signal strength range.

12. An optical receiver as set forth in claim 10, wherein the adjustment circuit is configured to attenuate the fiber optical signal to be within the second predetermined signal strength based on the adjustment value.

13. An optical receiver as set forth in claim 10, further comprising a memory storage device in communication with said processor.

14. An optical receiver as set forth in claim 10, wherein the adjustment circuit is further configured to attenuate the fiber optic signal and output an adjusted fiber optic signal having an adjusted signal strength that is within the predetermined signal strength range.

15. An optical receiver as set forth in claim 14, wherein the adjustment circuit is further configured to reduce the attenuation if the signal strength falls below the first predetermined signal strength range.

16. A method as set forth in claim 5, further comprising transmitting the fiber optic signal without adjustment if the measured signal strength is outside the second predetermined signal strength range but within the first predetermined signal strength range.

17. An optical receiver as set forth in claim 10, wherein said adjustment circuit is configured to transmit the fiber optic signal without adjustment if the fiber optic signal is received outside of the second predetermined signal strength range but within the first predetermined signal strength range.

18. A method as set forth in claim 5, wherein the adjustment value is adjusted to be within a predetermined numerical distance from at least one of the sensitivity rate and the saturation rate.

* * * * *